Jan. 28, 1958     A. L. HUGHES     2,821,041
COMBINATION FISHING ROD HOLDER AND FISH HOOKING DEVICE
Filed Sept. 9, 1955
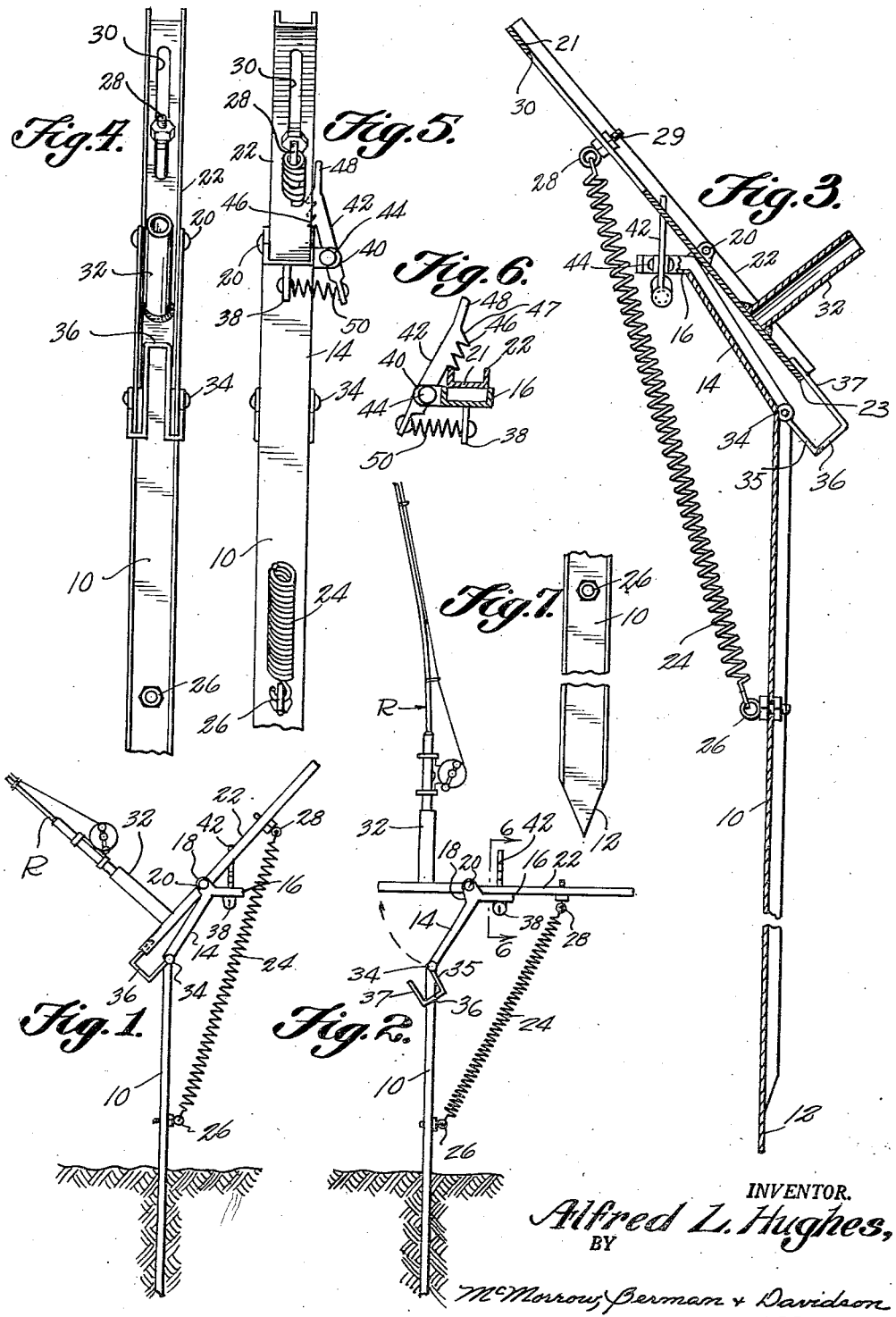
INVENTOR.
Alfred L. Hughes,
BY
McMorrow, Berman + Davidson
ATTORNEYS

United States Patent Office 2,821,041
Patented Jan. 28, 1958

2,821,041

COMBINATION FISHING ROD HOLDER AND FISH HOOKING DEVICE

Alfred L. Hughes, North Platte, Nebr.

Application September 9, 1955, Serial No. 533,423

2 Claims. (Cl. 43—16)

This invention relates to an improved fishing rod holder of the kind having spring-operated rod moving means which is triggered to move a fishing rod for setting a hook by a pull exerted by a fish on the line of the fishing rod.

The primary object of the invention is to provide a more efficient and practical device of this kind which is easier to use and operate, and which can be made in rugged and serviceable forms at relatively low cost.

Other objects of the invention will appear from the following description, and from the annexed drawings in which like reference characters designate like parts throughout the several views and wherein:

Figure 1 is a side elevational view of the device in accordance with the present invention showing the device in set position and holding a fishing rod;

Figure 2 is a view similar to Figure 1, showing the device in released position;

Figure 3 is an enlarged vertical sectional view taken through Figure 1;

Figure 4 is a fragmentary front elevational view of the device looking toward the left in Figure 3;

Figure 5 is a fragmentary rear elevational view of the device looking toward the right in Figure 3;

Figure 6 is an enlarged fragmentary transverse vertical sectional view taken on line 6—6 of Figure 2; and Figure 7 is a contracted and fragmentary rear elevational view of the lower portion of the standard.

Referring to the drawings in detail, the illustrated device comprises an upstanding standard or post 10, having, as shown in Figure 7, a pointed lower end 12 adapted to facilitate driving the post into the ground. The post is of channel shaped cross section, and integrally connected to the post at the upper end thereof is a rearwardly inclined bracket 14 merging at its upper end into a relatively short, horizontal, rearwardly projecting arm 16. At the juncture of the arm 16 and the bracket 14 is a pair of upstanding laterally spaced ears 18, and extending between the ears is a pivot pin 20 passing through an intermediate portion of a forwardly and rearwardly rockable fishing rod supporting bar 22. The bar 22, the arm 16 and the bracket 14 are of channel form, as shown to particular advantage in Figure 6.

An elongated helical retracting spring 24 is connected at its lower end to an eye 26 secured to the midlength portion of the post 10, and at its upper end is connected to an eye 28 having a shank 29 extending upwardly through a longitudinal slot 30 formed in the web 21 of bar 22. Nuts are threaded upon the shank 29 of the eye and bear against the upper and lower faces of the web 21, so as to secure the eye 28 to the bar 22 at selected locations along the bar 22. It will be understood that the longitudinal adjustment of the eye 28 provides for adjusting the effective tension of the spring 24.

The spring 24 is connected to the rearward end portion of the bar rearwardly of the pivot axis 20 thereof. Fixed to the forward portion of the bar 22 is an upstanding cylindrical and vertically elongated socket 32 in which is removably engageable the butt of a fishing rod R. The socket 32 is extended perpendicularly to the length of the bar 22, so that when the bar 22 is positioned in the rearwardly inclined position of Figure 1, awaiting a strike by a fish on the line of the fishing rod R, the rod will be supported in a rearwardly inclined, forwardly tilted position.

At the juncture between the upper end of the standard 10 and bracket 14, a pivot pin 34 traverses the standard, and pivotally connected at one end to said pin 34 is the lower arm 35 of a U-shaped catch 36. The catch 36, which includes an upper leg 38, may be formed from a length of wire material. The lower arm 35 of the catch is shorter than the upper leg 37 and the free end of the upper leg 37 is arranged to be engaged over the forward end 23 of the bar 22 so as to hold the bar 22 in its rearwardly inclined set position, as shown in Figure 3, against the pull exerted by the spring 34 upon the forward end portion of the bar 22.

Referring now to Figures 5 and 6, rigid with and extending downwardly from the horizontal leg 16 of the support bracket is an ear 38. Another ear 40 projects laterally from one side of the arm 16. A vertical latch 42 is pivoted at its lower end and on the ear 40 by means of a pin 44. Compressed between and connected to the lower end of the latch 42 and the ear 38 is an expanding spring 50, normally biasing the upper part of the latch 42 toward the adjacent side of the bar 22.

The upper end portion of the latch 42 is provided with a longitudinal series of tapered teeth 46, any of which can be engaged with the upper side of the upper portion of the bar 22 when the bar 22 is in its rearwardly inclined set position. The top surfaces 47 of the teeth 46 are sloped to provide cam-like surfaces, and the upper end of the latch is extended to provide a finger grip or handle 48.

The latch 42 is arranged so that when the bar 22 has been rocked to its horizontal operated position, shown in Figure 2, the spring 50 acts to position the teeth 46 over the top of the bar 22 and hold the bar 22 in this horizontal position.

In use of the device, and with the parts initially in their Figure 2 position, a fishing rod R is inserted in the socket 32, after having made a cast. Then the bar 22, against the restraint of the spring 24, is tilted forwardly to its Figure 1 position. In moving to this rearwardly inclined set position, the bar 22 engages the cam surfaces 47 of the teeth and displaces the latch 42 and passes below the teeth 46, whereat the spring 50 acts to engage a tooth with the upper side of the bar 22 and hold it in the set position.

With the bar 22 thus held in its Figure 1 position, the user swings the catch 36 upwardly from its Figure 2 position, and engages the free end of the upper leg 37 of the catch over the forward end 23 of the bar 22.

With the parts in their set positions, a pull by a fish on the line of the fishing rod R will act to tilt the bar 22 slightly in a counterclockwise direction in Figure 1. As a result, the strong pressure with which the bar 22 engages the catch 36 under the pull of spring 24 is temporarily lessened, so that the catch 36 is freed to disengage from the bar 22 and gravitate to its depressed, Figure 2 position. As a result, spring 24, being now free to contract, swings the bar 22 sharply downwardly and rearwardly so that the rod R is snapped to the upright position thereof shown in Figure 2. As the bar 22 swings to its horizontal Figure 2 position, it ratchets past the latch teeth 46, with the lowermost tooth 46 ultimately engaging over the bar 22 and locking the bar 22 in this horizontal position. The rod R is thus held firmly in an upright position, and the angler may remove the same from the socket with maximum speed and ease, to play and reel in the fish.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a fishing rod holder, a standard having an upper end, and having a rearward side, a rearwardly inclined bracket on the upper end of the standard, said bracket having an upper end, a rearwardly projecting horizontal arm on the upper end of the bracket, a straight forwardly and rearwardly rockable bar pivoted at a point intermediate its ends on said bracket at the juncture of the bracket and said arm, said bar being arranged to occupy a rearwardly inclined and forwardly tilted set position and having a forward portion overlying the bracket in the set position of the bar, said bar having a rearward portion arranged to extend upwardly and rearwardly above and beyond said arm in the set position of the bar, a latch pivoted on the upper end of the standard having an arm freely engageable over the forward portion of the bar only in the set position of the bar, a retracting spring stretched between said rearward portion of the bar and an intermediate portion of the standard and urging said bar to tilt rearwardly from its set position toward a horizontal operated position, the pull of said spring and the resultant pivoting of the bar serving to maintain engagement of the catch with said forward portion of the bar whereby tilting of the bar in a forward direction serves to free the catch from engagement with the forward portion of the bar, and an upstanding fishing rod socket on said forward portion of the bar.

2. In a fishing rod holder, a standard having an upper end, and having a rearward side, a rearwardly inclined bracket on the upper end of the standard, said bracket having an upper end, a rearwardly projecting horizontal arm on the upper end thereof, a straight forwardly and rearwardly rockable bar pivoted at a point intermediate its ends on said bracket at the juncture of the bracket and said arm, said bar being arranged to occupy a rearwardly inclined and forwardly tilted set position and having a forward portion overlying the bracket in the set position of the bar, said bar having a rearward portion arranged to extend upwardly and rearwardly above and beyond said arm in the set position of the bar, a latch pivoted on the upper end of the standard having an arm freely engageable over the forward portion of the bar only in the set position of the bar, a retracting spring stretched between said rearward portion of the bar and an intermediate portion of the standard and urging said bar to tilt rearwardly from its set position toward a horizontal operated position, the pull of said spring and the resultant pivoting of the bar serving to maintain engagement of the catch with said forward portion of the bar, tilting of the bar in a forward direction serving to free the catch from engagement with the forward portion of the bar, an upstanding fishing rod socket on said forward portion of the bar, and latch means mounted on said horizontal arm compressing an upstanding latch pivoted at its lower end on said arm, said latch having vertically spaced teeth having cam surfaces on their upper sides, and spring means urging said latch toward a side of the bar, said cam surfaces being engageable by the bar as the bar is tilted rearwardly by the retracting spring upon release of the catch from the bar and as the bar is moved toward said horizontal position, the latch being laterally displaced as the bar approaches its horizontal position until the latch teeth are above the bar, said spring means then serving to maintain a latch tooth engaged over the bar in its horizontal position.

References Cited in the file of this patent

UNITED STATES PATENTS

| | | |
|---|---|---|
| 888,484 | Gehorsam | May 26, 1908 |
| 1,549,405 | Bjurstrom | Aug. 11, 1925 |
| 2,642,690 | Soenksen | June 23, 1953 |
| 2,740,219 | Harden | Apr. 3, 1956 |